United States Patent
Candelore et al.

(10) Patent No.: US 10,885,339 B2
(45) Date of Patent: Jan. 5, 2021

(54) DISPLAY OF INFORMATION RELATED TO AUDIO CONTENT BASED ON AMBIENT LIGHTING CONDITIONS

(71) Applicant: SONY CORPORATION, Tokyo (JP)

(72) Inventors: Brant Candelore, San Diego, CA (US); Mahyar Nejat, San Diego, CA (US); Peter Shintani, San Diego, CA (US); Robert Blanchard, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/433,388

(22) Filed: Jun. 6, 2019

(65) Prior Publication Data

US 2020/0387708 A1   Dec. 10, 2020

(51) Int. Cl.
*G06K 9/00* (2006.01)
*G06T 19/00* (2011.01)
*G02B 27/01* (2006.01)

(52) U.S. Cl.
CPC ....... *G06K 9/00671* (2013.01); *G02B 27/017* (2013.01); *G02B 27/0179* (2013.01); *G06T 19/006* (2013.01); *G02B 2027/0178* (2013.01); *G02B 2027/0187* (2013.01)

(58) Field of Classification Search
CPC .............. G06K 9/00671; G02B 27/017; G02B 27/0179; G02B 2027/0178; G02B 2027/0187; G06T 19/006
See application file for complete search history.

(56) References Cited

U.S. PATENT DOCUMENTS

| | | | |
|---|---|---|---|
| 9,013,671 B2* | 4/2015 | Huber | G03B 21/00 352/40 |
| 2015/0053067 A1* | 2/2015 | Goldstein | G02C 11/10 84/609 |
| 2015/0116198 A1 | 4/2015 | McCoy et al. | |
| 2019/0094554 A1* | 3/2019 | Benesh | G02B 27/017 |
| 2019/0279407 A1* | 9/2019 | McHugh | G06T 19/006 |

* cited by examiner

*Primary Examiner* — Xin Sheng
(74) *Attorney, Agent, or Firm* — Chip Law Group

(57) ABSTRACT

A head-mounted device includes a first image capturing device, a transparent display, and circuitry. The first image capturing device captures an image of a scene in a line-of-sight (LOS) of a wearer of the head-mounted device. The circuitry receives an audio segment that corresponds to audio content. The circuitry determines a level of each image characteristic of a background portion and a foreground portion of the captured image. The circuitry estimates a first region on a display portion of the transparent display for display of text information associated with the received audio segment. The circuitry determines a level of each display characteristic from a set of display characteristics for the text information based on the estimated first region and the determined level of each image characteristic. The circuitry controls the display of the text information in the estimated first region of the display portion of the transparent display.

20 Claims, 8 Drawing Sheets

DISPLAY OF INFORMATION RELATED TO AUDIO CONTENT BASED ON AMBIENT LIGHTING CONDITIONS

CROSS-REFERENCE TO RELATED APPLICATIONS/INCORPORATION BY REFERENCE

None.

FIELD

Various embodiments of the disclosure relate to audio reproduction technologies. More specifically, various embodiments of the disclosure relate to an apparatus and method for display of information related to audio content based on ambient lighting conditions.

BACKGROUND

Advancements in the field of audio-video (AV) content reproduction have led to an increase in utilization of different display technologies to display the AV content. One of such display technologies is a transparent display or see-through display in different wearable devices (for example, head-mounted display or smart glasses. In certain conventional techniques, the AV content is rendered along with closed caption information (or subtitles) associated with the rendered AV content. Such closed caption information (for example lyrics of audio content) may enhance user experience in understanding of the rendered AV content. In certain situations, when the closed caption information is displayed on the transparent display of the wearable devices, different ambient lighting conditions around the wearable device may influence display characteristics (such as brightness, contrast, color) of the displayed closed caption information which may be undesirable to a wearer of the wearable device. In certain conventional techniques, the displayed closed caption information also obscure visible objects in the displayed AV content, which may be not visually pleasing to a viewer of the AV content. Thus, an advanced and intelligent system may be desired to dynamically control the display of the closed caption information on the wearable devices and provide an enhanced content reproduction experience to the wearer.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An apparatus and method for display of information related to audio content based on ambient lighting conditions is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
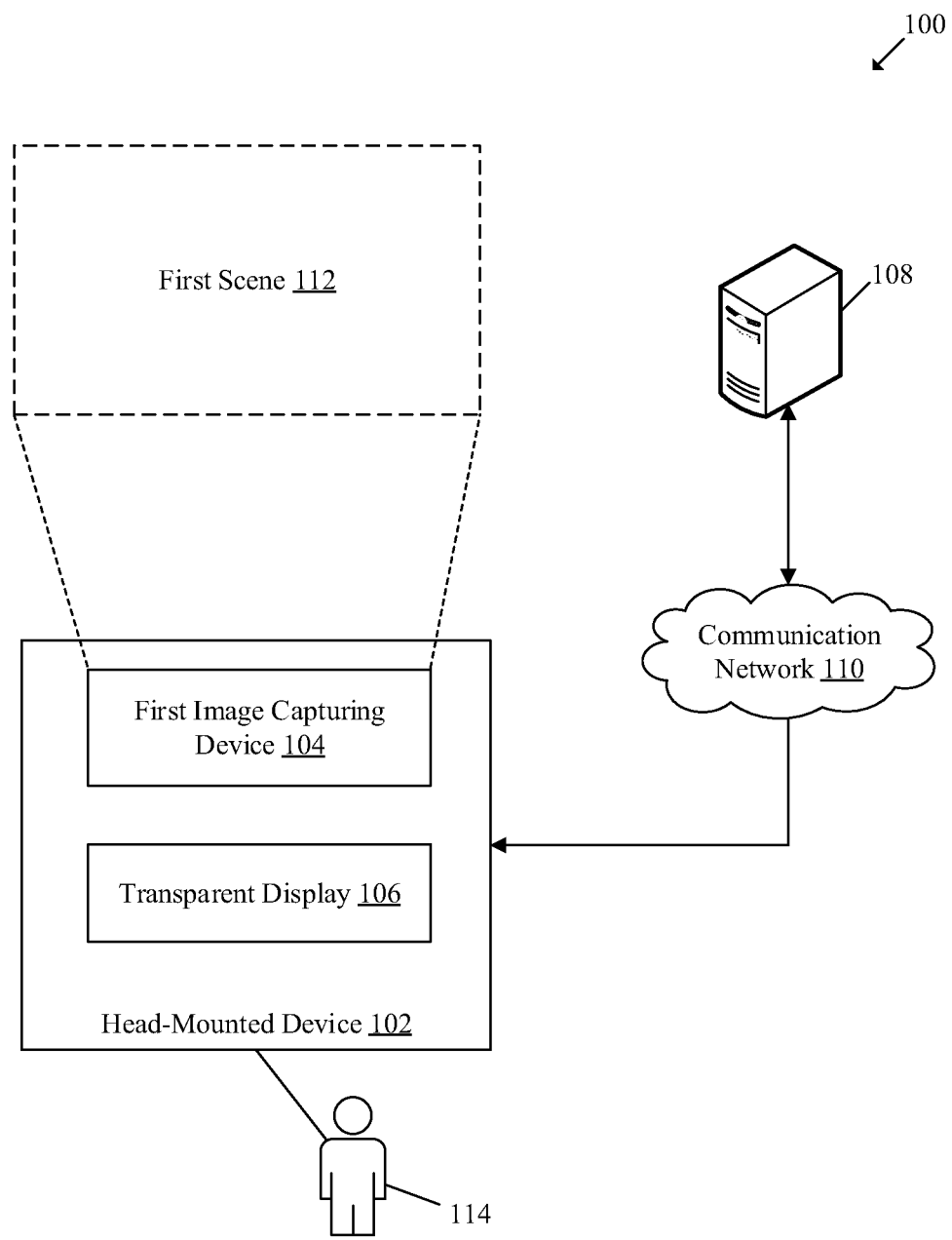
FIG. 1 is a block diagram that illustrates an exemplary network environment for display of information related to audio content based on ambient lighting conditions, in accordance with an embodiment of the disclosure.

The following described implementations may be found in the disclosed apparatus and method for display of information related to audio content based on ambient lighting conditions. Exemplary aspects of the disclosure provide a head-mounted device that dynamically controls the display of closed caption information based on the ambient lighting conditions around the head-mounted device to provide enhanced visibility and readability of the closed caption information to a wearer of the head-mounted device. The head-mounted device may include a transparent display and a first image capturing device. The head-mounted device may further include circuitry coupled to the transparent display and the first image capturing device. The first image capturing device may be configured to capture an image of a scene in a line-of-sight (LOS) of a wearer of the head-mounted device. Alternatively stated, the first image capturing device may be configured to capture the image of the scene which the wearer may be currently viewing.

The head-mounted device may be configured to determine a level of each image characteristic from a plurality of image characteristics of a background portion and a foreground portion of the captured image. The image characteristics may correspond to ambient lighting conditions. For example, the plurality of image characteristics may include a brightness, a contrast, a background color, a foreground color, a saturation, a hue, and a gamma parameter and the like. The head-mounted device may be further configured to estimate a region on a display portion of the transparent display for display of text information (e.g. closed caption information) associated with an audio segment. The head-mounted device may be further configured to determine a level of each display characteristic from a set of display characteristics (such as foreground color, a background color, a contrast, and a brightness) for the text information based on the estimated region and the determined level of each image characteristic. The head-mounted device may be further configured to control the display of the text information in the estimated region of the display portion, based on the determined level of each display characteristic. Therefore, the wearer of the head-mounted device may be able to view the text information for the received audio segment, based on the scene (or the ambient lighting conditions) in the LOS of the wearer such that the displayed text information is clearly readable by the wearer of the head-mounted device. Further, the head-mounted device may be configured to control a display position of the text information on the transparent display based on estimation of brightness level for each region on the transparent display such that the displayed text information does not obscure a region-of-interest of the wearer or the displayed AV content with which the text information may be associated. Therefore, the head-mounted device dynamically controls the display of the text information associated with the received audio content to provide an enhanced content reproduction experience to the wearer.

FIG. 1 is a block diagram that illustrates an exemplary network environment for display of information related to audio content based on ambient lighting conditions, in accordance with an embodiment of the disclosure. With reference to FIG. 1, there is shown a network environment 100, which may include a head-mounted device 102, a first image capturing device 104, a transparent display 106, a server 108, and a communication network 110. The head-mounted device 102 may include the first image capturing device 104 and the transparent display 106. There is further shown a wearer 114 who may be associated with the head-mounted device 102. The head-mounted device 102 may be communicatively coupled to the server 108 via the communication network 110. In FIG. 1, there is further shown a first scene 112. The first image capturing device 104 may be configured to capture a plurality of images of the first scene 112. The first scene 112 may include a plurality of objects.

The head-mounted device 102 may comprise suitable logic, circuitry, and interfaces that may be configured to receive an audio segment that corresponds to audio content. Examples of the audio content may include, but are not limited to, a song, a musical tone, a musical clip, or like. The head-mounted device 102 may be configured to receive the audio segment from an audio capturing device situated in a live event as the first scene 112. In some embodiments, the audio segment may be received from the server 108 or an internal memory (not shown). The head-mounted device 102 may be further configured to receive an image captured by the first image capturing device 104. The head-mounted device 102 may be configured to determine a level of each image characteristic from a plurality of image characteristics of a background portion and a foreground portion of the captured image. The head-mounted device 102 may be further configured to control display of text information (i.e. closed caption information) associated with the received audio segment on the transparent display 106 based on the determined level of each image characteristic. In accordance with an embodiment, the head-mounted device 102 may be a wearable device. Examples of the head-mounted device 102 may include, but are not limited to, a smart glass, a Virtual Reality (VR)-based head-mounted device, an Augmented Reality (AR)-based head-mounted device.

The first image capturing device 104 may comprise suitable logic, circuitry, and interfaces that may be configured to capture the plurality of images of the first scene 112 in a line-of-sight (LOS) of the wearer 114 of the head-mounted device 102. Examples of the first image capturing device 104 may include, but are not limited to, a camera, an image sensor, an action camera, a closed-circuit television (CCTV) camera, a camcorder, a night-vision camera and/or other image capturing devices.

The transparent display 106 may comprise suitable logic, circuitry, and interfaces that may be configured to display the text information associated with the received audio segment. In some embodiments, the transparent display 106 may be configured to display the audio-video (AV) content which includes the audio content. In some embodiments, the transparent display 106 may be configured to display the text information associated with the audio-video content. The transparent display 106 may be a see-through display. The wearer 114 may be able to see-through the transparent display 106 to view the first scene 112 in the LOS of the wearer 114. In some embodiments, the transparent display 106 may be a touch screen, which may enable the wearer 114 to provide input to the head-mounted device 102 via the transparent display 106. The transparent display 106 may be realized through several known technologies such as, but not limited to, at least one of a see-through Liquid Crystal Display (LCD) display, a see-through Light Emitting Diode (LED) display, or a see-through Organic LED (OLED) display technology, or other see-through displays. In accordance with an embodiment, the transparent display 106 may refer to, but not limited to, a display screen of a head-mounted device, a smart-glass device, a see-through display, a projection-based display, an electro-chromic display, or a transparent display.

The server 108 may comprise suitable logic, circuitry, and interfaces that may be configured to store the audio content or the audio-video content. The server 108 may be configured to receive a request for the audio content or the or the audio-video content from the head-mounted device 102. The server 108 may be further configured to transmit the audio content or the audio-video content to the head-mounted device 102 based on the received request. In accordance with an embodiment, the server 108 may be further configured to receive and store the plurality of images captured by the first image capturing device 104. The server 108 may be further configured to store the text information (for example closed caption information or lyrics information) associated with the audio content. Examples of the server 108 may include, but are not limited to a database server, a file server, a web server, a cloud server, an application server, a mainframe server, or other types of server.

In accordance with an embodiment, the server 108 may be a personal media device that may deliver the audio content or the audio-video content to the head-mounted device 102, via the communication network 110. Examples of the personal media device may include, but are not limited to, a smartphone, a music player, a video player, a laptop, a personal computer, a personal external storage, and a flash drive.

The communication network 110 may include a communication medium through which the head-mounted device 102 and the server 108 may communicate with each other. Examples of the communication network 110 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the head-mounted device 102 may be configured to receive an audio segment which corresponds to the audio content such as a song, a musical tone, and a video which also includes audio data. In some embodiments, the audio segment may be of live music or song performed at a live event in real time. In some other embodiment, the received audio segment may be pre-recorded audio content that may be received from the internal memory or from the server 108, via the communication network 110. In some embodiments, the audio segment may be received from an audio capturing device, such as microphone, associated with a human speaker (such as singer) during the live event. The head-mounted device 102 may be worn by the wearer 114.

In accordance with an embodiment, the head-mounted device 102 may include the first image capturing device 104. The first image capturing device 104 may be configured to capture an image of the first scene 112 in a line-of-sight (LOS) of the wearer 114. The captured image may include one or more living or non-living objects. In accordance with an embodiment, the head-mounted device 102 may further include a second image capturing device that may be configured to track an eye movement of the wearer 114. An example of the second image capturing device may include, but is not limited to, an image sensor configured to track the eye movement of the wearer 114. The LOS of the wearer 114 may be determined based on the tracked eye movement of the wearer 114. In accordance with an embodiment, the head-mounted device 102 may further include an orientation sensor configured to determine an orientation of the head-mounted device 102 in a worn state of the head-mounted device 102. The orientation sensor may be configured to determine the orientation of the head-mounted device 102 with respect to the position of head of the wearer 114. The head-mounted device 102 may be configured to determine the LOS of the wearer 114 based on the determined orientation and the tracked eye movement of the wearer 114.

In accordance with an embodiment, the head-mounted device 102 may be further configured to determine a level of each image characteristic of a plurality of image characteristics of a background portion and a foreground portion of the captured image. The plurality of image characteristics may correspond to ambient lighting conditions. The ambient lighting conditions may be lighting conditions of the first scene 112 or lighting conditions around the head-mounted device 102 in a direction of the LOS of the wearer 114. In accordance with an embodiment, the plurality of image characteristics may include, but are not limited to, a brightness, a contrast, a background color, a foreground color, a saturation, a hue, and a gamma parameter of the captured image. The head-mounted device 102 may be configured to determine the level of each image characteristic considering the influence of the ambient lighting conditions on the plurality of image characteristics of the captured image. For example, when the first image capturing device 104 captures the image of the first scene 112 in a day, a brightness level of the captured image will be higher as compared to when the first image capturing device 104 captures the image of the first scene 112 at night. The brightness level of the captured image may be a measure of overall lightness or overall darkness of the captured image.

In accordance with an embodiment, the head-mounted device 102 may be further configured to store lyrics or closed caption information associated with the audio content, for example, a song. The lyrics or closed caption information may include textual representation, transcription or translation of the audio content. The head-mounted device 102 may be further configured to identify a position of the received audio segment in the audio content, based on the stored lyrics information. The head-mounted device 102 may be configured to extract text information (e.g. closed caption information) from the stored lyrics information based on the identified position. The extracted text information may be associated with the received audio segment. In accordance with an embodiment, the audio content may include synchronization information which may indicate timing information. The head-mounted device 102 may be configured to extract the text information from the stored lyrics information based on the timing information associated with the audio segment of the audio content. For example, the timing information of the audio segment (i.e. portion of a song) indicates a song portion of 3 seconds (say from $10^{th}$ second to $12^{th}$ second) of the audio content. In such case, the head-mounted device 102 may be configured to extract the text information (i.e. closed caption of the audio segment) of 3 seconds (say from $10^{th}$ second to $12^{th}$ second) from the stored lyrics information.

In accordance with an embodiment, the head-mounted device 102 may further include a transparent display 106. The transparent display 106 may be configured to display the plurality of images of the first scene 112 which are also captured by the first image capturing device 104. The head-mounted device 102 may be further configured to estimate a first region on a display portion of the transparent display 106 for display of the text information associated with the received audio segment. The first region may be estimated based on the determined level of each image characteristic from the plurality of image characteristics of the captured image. For example, the estimated first region on the display portion of the transparent display 106 may be determined based on one region in the captured image where the brightness level and the contrast level may be higher than other regions of the captured image. In some embodiments, the first region may be estimated based on the determined LOS (i.e. where the wearer 114 may be currently looking at) of the wearer 114. For example, if the LOS of the wearer 114 changes from a first position to a second position, then the estimated first region on the display portion may change to a second region on the display portion of the transparent display 106. In another example, if an object, in the captured image, that may gain an attention of the wearer 114, then the LOS of the wearer 114 may change, and therefore, the estimated first region on the display portion may change to a second region on the display portion based on the change LOS of the wearer 114.

The head-mounted device 102 may be further configured to select a set of display characteristics from a plurality of display characteristics for the display of the text information (e.g. text for the received audio segment). The plurality of display characteristics may include a foreground color, a background color, a contrast, and a brightness of the text information to be displayed on the display portion of the transparent display. The head-mounted device 102 may be further configured to determine a level of each display characteristic from the selected set of display characteristics for the text information. The level of each display characteristic may be determined based on the estimated first region and the determined level of each image characteristic of the captured image. For example, a brightness level and a foreground color (or font color) for the text information may be determined based on the determined background color of the captured image and the estimated first region. The determined level of each display characteristic for the text information may be in contrast with the determined level of each image characteristic of the captured image. For example, the foreground color of the text information may be determined based on the background color of the captured image, such that the foreground color of the text information is in contrast with the background color of the captured image and the estimated first region on the display portion such that visibility and clarity of the text information is high.

The head-mounted device 102 may be further configured to control the display of the text information in the estimated first region of the display portion of the transparent display 106. The text information may be displayed within the estimated first region which may be determined based on the LOS of the wearer 114. Thus, the text information may be displayed in the estimated first region wherever the wearer 114 may be currently looking. In another embodiment, the text information may be displayed within the first region which may not obstruct a view of a plurality of objects in the first scene 112 through the see-through transparent display 106 of the head-mounted device 102. In accordance with an embodiment, the head-mounted device 102 may be further configured to control display of the text information based on the determined level of each display characteristic of the text information.

In accordance with an embodiment, the head-mounted device 102 may be further configured to partition the captured image into a plurality of image regions. The head-mounted device 102 may be further configured to estimate a brightness level for each of the plurality of image regions. The brightness level for each of the plurality of image regions may be different. The head-mounted device 102 may be further configured to determine a first image region from the plurality of image regions based on the brightness level for each of the plurality of image regions. The first image region may be determined such that, the brightness level of the determined first image region may be maximum among the brightness level for each of the plurality of image regions. In some embodiments, the first image region may correspond to the estimated first region on the display portion of the transparent display 106. In accordance with an embodiment, the head-mounted device 102 may be further configured to control the display of the text information within the determined first region of the display portion of the transparent display 106, based on the determined first image region of the captured image. The partition of the captured image in the plurality of image regions and display of the text information in the first image region is further shown and described, for example, in FIGS. 6A and 6B.

In accordance with an embodiment, the head-mounted device 102 may further include a speaker configured to output the received audio segment. The head-mounted device 102 may be configured to control playback of the received audio segment via the speaker. The head-mounted device 102 may control the playback of the received audio segment such that the output of the audio segment is in synchronization with the display of the text information in the first region of the display portion of the transparent display 106. Thus, the wearer 114 of the head-mounted device 102 may be able to view the text information associated with the received audio segment on the display portion of the transparent display 106 and concurrently hear the received audio segment via the speaker in real-time or near real-time.

In accordance with an embodiment, the head-mounted device 102 may be further configured to control display of an enhanced view of an object, of the one or more objects in the foreground portion of the captured image, on the display portion of transparent display 106. The head-mounted device 102 may be configured to control the display of the enhanced view of the object, based on a selection of the object in the captured image. The head-mounted device 102 may receive a user-input (for example a zoom operation) for the selection of the object from the one or more objects in the captured image from the wearer 114. The head-mounted device 102 may be further configured to determine the level of each image characteristic of the plurality of image characteristics associated with the enhanced view of the object. For example, the head-mounted device 102 may be configured to determine the brightness level, the contrast level, the background color, or the foreground color of the enhanced view of the object in the captured image.

The head-mounted device 102 may be further configured to determine the level of each display characteristic from the set of display characteristics (such as brightness, contrast, etc.) for the text information based on the determined level of each image characteristic associated with the enhanced view of the object. For example, the head-mounted device 102 may be configured to determine a brightness level and a foreground color for the text information based on the foreground color of the enhanced view of the object of the captured image. The display of the enhanced view of the object of the captured image and the text information is further shown and described in detail, for example, in FIGS. 7A and 7B.

Figure 2:
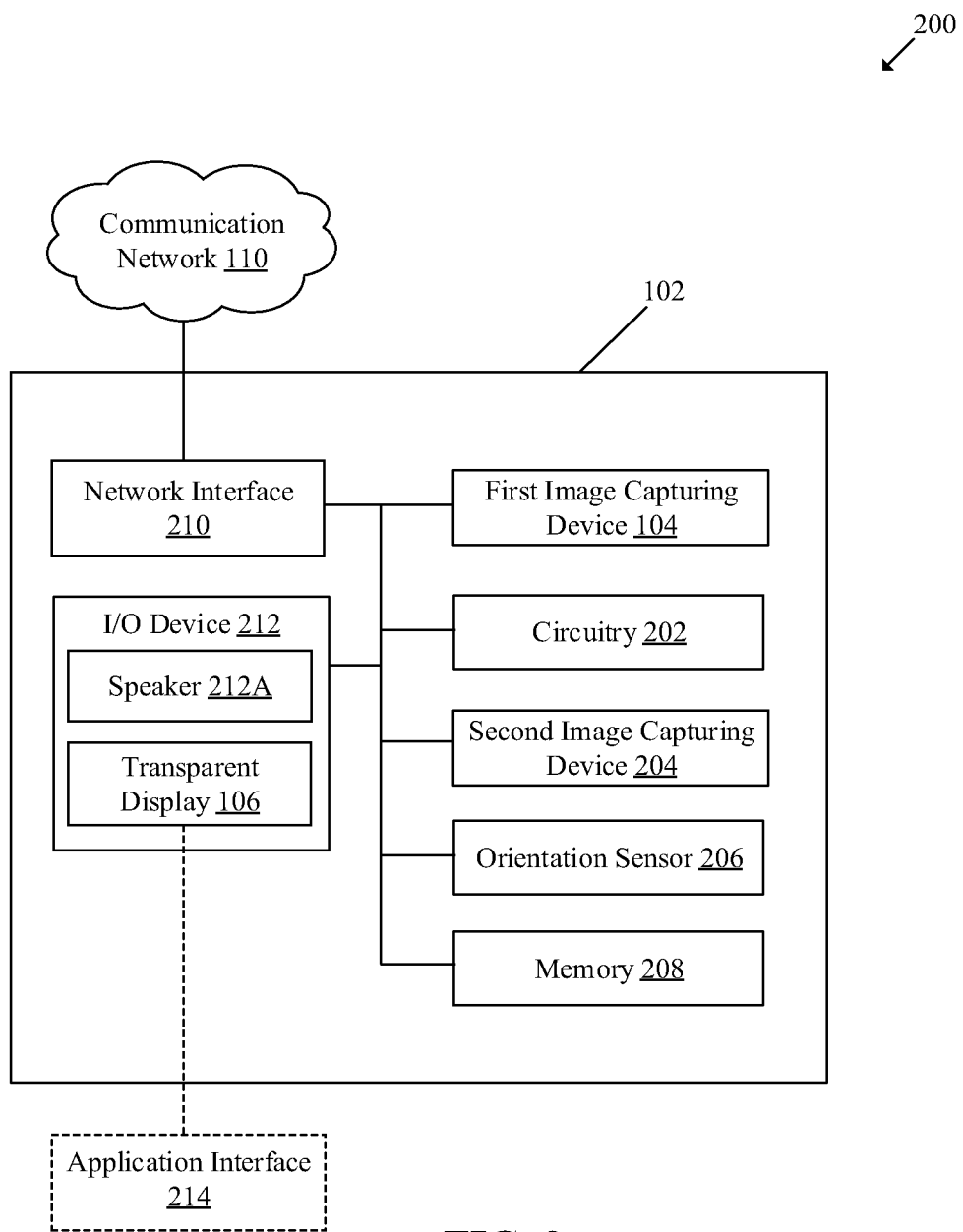
FIG. 2 is a block diagram that illustrates an exemplary head-mounted device for display of information related to audio content based on ambient lighting conditions, in accordance with an embodiment of the disclosure.

FIG. 2 is a block diagram that illustrates an exemplary head-mounted device for display of information related to audio content based on ambient lighting conditions, in accordance with an embodiment of the disclosure. FIG. 2 is explained in conjunction with elements from FIG. 1. With reference to FIG. 2, there is shown the head-mounted device 102. The head-mounted device may include the first image capturing device 104, a circuitry 202, a second image capturing device 204, an orientation sensor 206, a memory 208, a network interface 210, and an input/output (I/O) device 212. The I/O device 212 may include a speaker 212A and the transparent display 106. The transparent display 106 may be utilized to render an application interface 214. The circuitry 202 may be communicatively coupled to the first image capturing device 104, the transparent display 106, the second image capturing device 204, the orientation sensor 206, the memory 208, and the I/O device 212. The circuitry 202 may be configured to communicate with the server 108, by use of the network interface 210.

The circuitry 202 may comprise suitable logic, circuit, and interfaces that may be configured to control one or more operations of the first image capturing device 104, the transparent display 106, the second image capturing device 204, the orientation sensor 206, the memory 208, and the I/O device 212. The circuitry 202 may be further configured to determine the level of each image characteristic of the plurality of image characteristics of the background portion and the foreground portion of the image captured by the first image capturing device 104. The circuitry 202 may be further configured to determine the level of each display characteristic from the set of display characteristics of the text information associated with the audio segment. The circuitry 202 may further control display of the text information in the first region of the display portion of the transparent display 106, based on the determined level of each display characteristic from the set of display characteristics. The circuitry 202 may be implemented based on a number of processor technologies known in the art. Examples of the processor technologies may be a Graphical Processing Unit (GPU), a Central Processing Unit (CPU), X86-based processor, a Reduced Instruction Set Computing (RISC) processor, an Application-Specific Integrated Circuit (ASIC) processor, a Complex Instruction Set Computing (CISC) processor, other processors, and the like.

The second image capturing device 204 may comprise suitable logic, circuitry, and interfaces that may be configured to track eye movement of the wearer 114. The second image capturing device 204 may be further configured to determine the LOS of the wearer 114. In accordance with an embodiment, the second image capturing device 204 may be implemented based on a plurality of sensors. The plurality of sensors may be implemented as embedded/wearable sensors with the head-mounted device 102. Examples of the second image capturing device 204 may include, but are not limited to, a camera, an image sensor, an action camera, a closed-circuit television (CCTV) camera, a camcorder, a night-vision camera and/or other image capturing devices.

The orientation sensor 206 may comprise suitable logic, circuitry, and interfaces that may be configured to determine the orientation of the head-mounted device 102 in the worn state of the head-mounted device 102. The orientation sensor 206 may be configured to determine the orientation of the head-mounted device 102 in the worn state, with respect to a position of the head of the wearer 114. In some embodiments, the orientation sensor 206 may be configured to determine movement of the head-mounted device 102 or the head of the wearer 114. The orientation sensor 206 may be implemented based on a plurality of sensors. The plurality of sensors may be implemented as embedded/wearable sensors with the head-mounted device 102. Examples of the orientation sensor 206 may include, but are not limited to, a gyroscope, an accelerometer, a tilt sensor, or other orientation sensor known in the art.

The memory 208 may comprise suitable logic, circuitry, and interfaces that may be configured to store one or more images captured by the first image capturing device 104. The memory 208 may be further configured to store the received audio segment that corresponds to the audio content (e.g. a song). The memory 208 may be further configured to store the lyrics information associated with the audio content. Examples of implementation of the memory 208 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 210 may comprise suitable logic, circuitry, and interfaces that may be configured to facilitate communication between the head-mounted device 102 and the server 108, via the communication network 110. The network interface 210 may be implemented by use of various known technologies to support wired or wireless communication of the head-mounted device 102 with the communication network 110. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The I/O device 212 may comprise suitable logic, circuitry, and interfaces that may be configured to receive an input from a user (such as the wearer 114) and provide an output to the wearer 114 based on the received input from the wearer 114. The I/O device 212 may include various input and output devices, which may be configured to communicate with the circuitry 202. Examples of the I/O device 212 may include, but are not limited to, a touch screen, a keyboard, a mouse, a joystick, a microphone, a display (for example, the transparent display 106), and a speaker (for example, the speaker 212A).

The application interface 214 may correspond to a user interface (UI) rendered on a display, such as the transparent display 106. The application interface 214 may display the text information on the display portion of the transparent display 106. An example of the application interface 214 may include, but is not limited to, a graphical user interface (GUI).

Figure 3A:
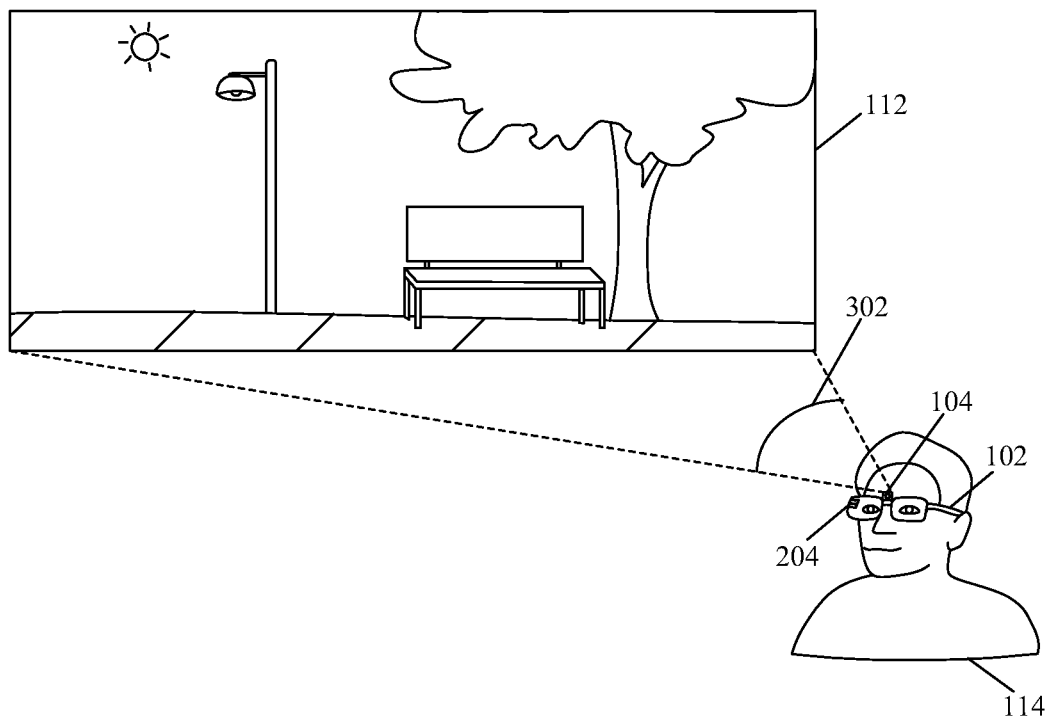
FIG. 3A illustrates an exemplary scenario of a head-mounted device worn by a wearer to view a scene, in accordance with an embodiment of the disclosure.

FIG. 3A illustrates a first exemplary scenario of a head-mounted device worn by a wearer to view a scene, in accordance with and embodiment of the disclosure. FIG. 3A is explained in conjunction with elements from FIG. 1 and FIG. 2. With reference to FIG. 3A, there is shown the head-mounted device 102, the first image capturing device 104, the first scene 112, the wearer 114, the second image capturing device 204, and a field-of-view 302 of the first image capturing device 104. In accordance with an embodiment, the head-mounted device 102 may be a wearable device that may be worn by the wearer 114 to view the first scene 112. In accordance with an embodiment, the head-mounted device 102 may include the first image capturing device 104 on a front side of the head-mounted device 102 to face the first scene 112. In accordance with an embodiment, the head-mounted device 102 may further include the second image capturing device 204 on a back side of the head-mounted device 102 to face the eyes of the wearer 114. In some embodiments, the second image capturing device 204 may be disposed at a particular position on a body of the head-mounted device 102 such that a field-of-view of the second image capturing device 204 is towards the eyes of the wearer 114.

The first image capturing device 104 may be configured to capture an image of the first scene 112 in the field-of-view 302 of the first image capturing device 104, based on the LOS of the wearer 114. The second image capturing device 204 may be configured to determine the LOS of the wearer 114 of the head-mounted device 102, based on a track of an eye movement of the wearer 114. The second image capturing device 204 may be configured to track the movement of the eyes of the wearer 114 viewing the first scene 112. The LOS of the wearer 114 may be determined further based on the orientation of the head-mounted device 102. The orientation sensor 206 of the head-mounted device 102 may be configured to determine the orientation of the head-mounted device 102 with respect the position of the head of the wearer 114. The first scene 112, which may be an outdoor scene or an indoor scene, may include a plurality of objects. The plurality of objects may be a living object or a non-living object.

Figure 3B:
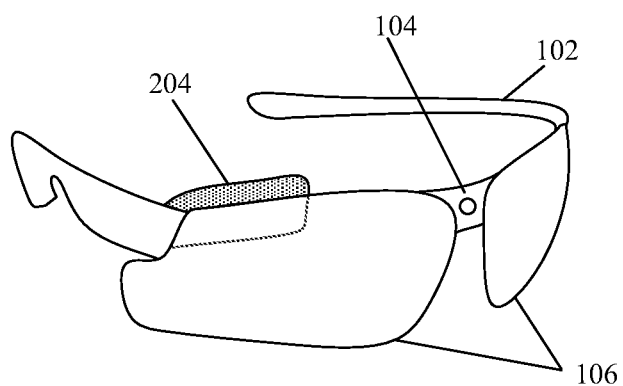
FIG. 3B illustrates a side view of an exemplary head-mounted device, in accordance with an embodiment of the disclosure.

FIG. 3B illustrates a side view of an exemplary head-mounted device, in accordance with an embodiment of the disclosure. FIG. 3B may be explained in conjunction with elements from FIG. 1, FIG. 2 and FIG. 3A. With reference to FIG. 3B, there is shown a side view of the head-mounted device 102. The head-mounted device 102 may include the first image capturing device 104, the transparent display 106, and the second image capturing device 204. In accordance with an embodiment, the first image capturing device 104 may be positioned on an element which connects two display portions of the transparent display 106. In some embodiments, the first image capturing device 104 may be positioned at a center position of the transparent display 106. In another embodiment, the first image capturing device 104 may be mounted on a particular position on an outer body of the head-mounted device 102 to face the first scene 112.

In accordance with an embodiment, the second image capturing device 204 may be positioned on the transparent display 106, such that the second image capturing device 204 may face towards the eyes of the wearer 114 of the head-mounted device 102. In accordance with an embodiment, the transparent display 106 may be a see-through glass.

It may be noted that the head-mounted device 102 shown in FIG. 3B is merely an example. The present disclosure may be also applicable to other types and structures of the head-mounted device 102 with various positions of the first image capturing device 104 and the second image capturing device 204. A description of other types and structures of the head-mounted device 102 has been omitted from the disclosure for the sake of brevity.

Figure 4:
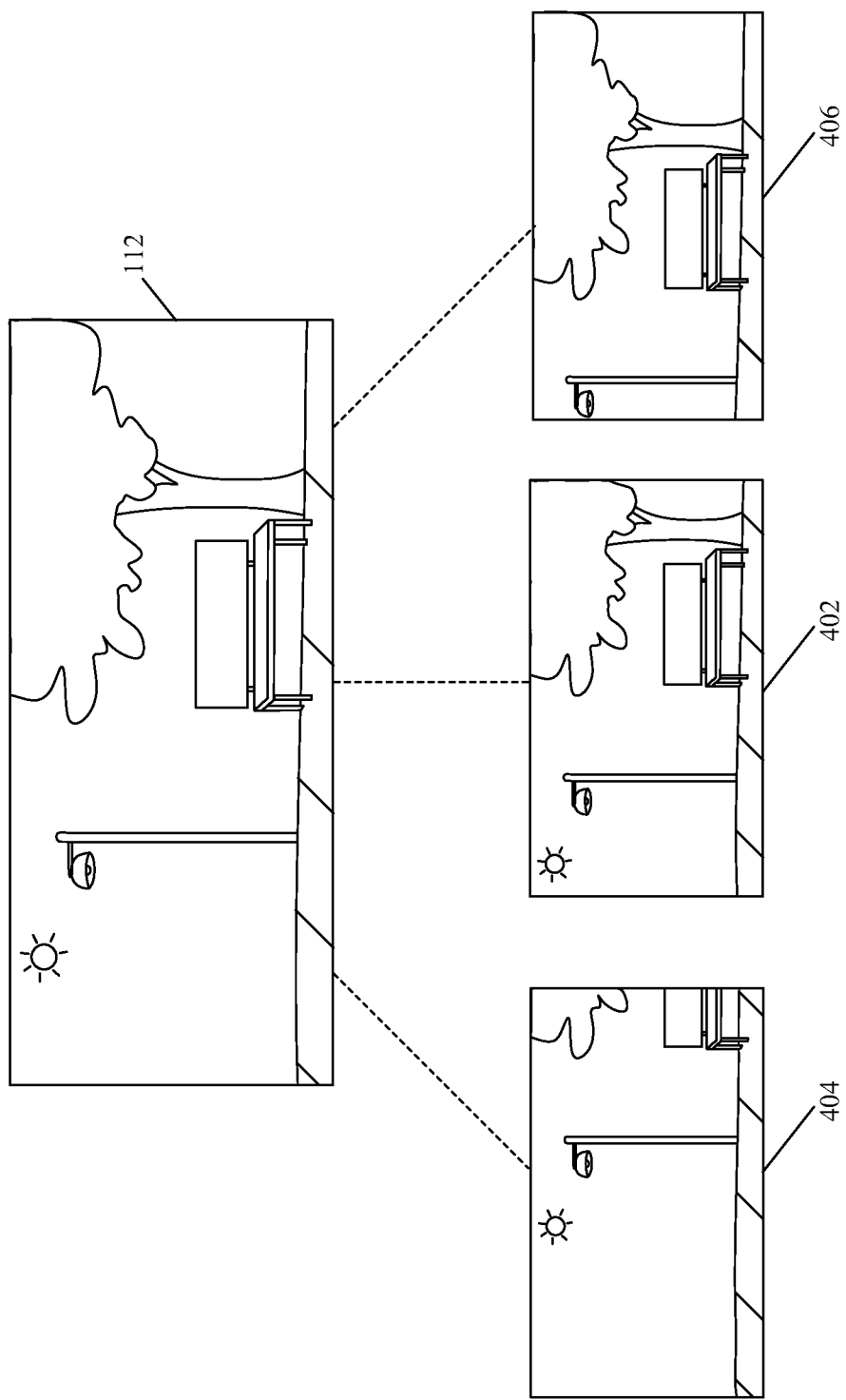
FIG. 4 illustrates an exemplary scenario which depicts a plurality of images captured by an image capturing device of the head-mounted device, in accordance with an embodiment of the disclosure.

FIG. 4 illustrates an exemplary scenario which depicts a plurality of images captured by an image capturing device of the head-mounted device, in accordance with an embodiment of the disclosure. FIG. 4 is explained in conjunction with elements from FIGS. 1, 2, 3A and 3B. With reference to FIG. 4, there is shown the first scene 112. There is further shown a plurality of images of the first scene 112. The plurality of image may include a first image 402, a second image 404, and a third image 406. In accordance with an embodiment, the first image capturing device 104 may be configured to capture the plurality of images of the first scene 112, based on a line-of-sight (LOS) of the wearer 114 of the head-mounted device 102. The first scene 112 may be in the field-of-view of the first image capturing device 104. The first image 402 may be captured based on a first LOS of the wearer 114 of the head-mounted device 102. Similarly, the second image 404 and the third image 406 may be captured based on a second LOS and a third LOS of the wearer 114 of the head-mounted device 102, respectively. The first LOS, the second LOS, and the third LOS may be different from each other. In accordance with an embodiment, the first LOS, the second LOS, and the third LOS may be in different directions with respect to the second image capturing device 204. The captured image, such as the first image 402, the second image 404, or the third image 406 may include images of a plurality of objects of the first scene 112. For example, as shown in FIG. 4, the first image 402 may include the plurality of objects, such as a tree, a bench, a lamp post, and a sun. The second image 404 may include the plurality of objects, such as the sun, the lamp post, and a smaller portion of the tree and the bench. The third image 406 may include the lamp post, the bench and the tree of the first scene 112. The captured image, such as the first image 402, the second image 404, or the third image 406 may be displayed on the transparent display 106 for the wearer 114 of the head-mounted device 102.

In accordance with an embodiment, the level of each image characteristics for each of the first image 402, second image 404, and the third image 406 may be different, based on a difference in ambient lighting condition or light illumination on the first image capturing device 104 of the head-mounted device 102. The ambient lighting condition on the first image 402, second image 404, and the third image 406 may be different due presence of different light sources, such as the sun or the lamp post in the first scene 112. For example, the first image 402 and the second image 404 may be brighter than the third image 406 due to presence of both sun and the glowing lamp post as the objects in the first image 402 and the second image 404. In another example, a contrast level of the third image 406 may be more than a contrast level of the first image 402 and the second image 404 due to absence of the sun as the object in the third image 406. Thus, based on change in the LOS of the wearer 114, the head-mounted device 102 may control the first image capturing device 104 to capture different images in different directions based on the LOS of the wearer 114 detected by the second image capturing device 204. The level of each image characteristics in the captured images may be different based on the ambient light conditions or the influence of light on the first image capturing device 104.

Figure 5A:
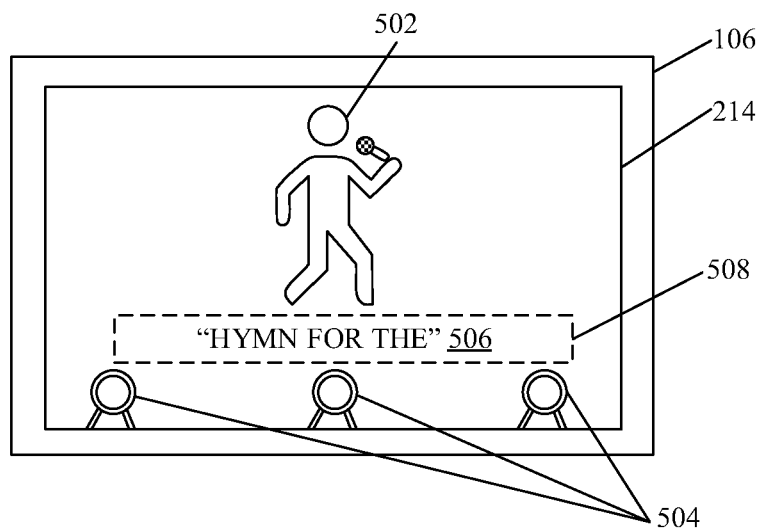
FIGS. 5A and 5B collectively illustrate an exemplary scenario for display of information related to audio content in a live event based on ambient lighting conditions, in accordance with an embodiment of the disclosure.
Figure 5B:
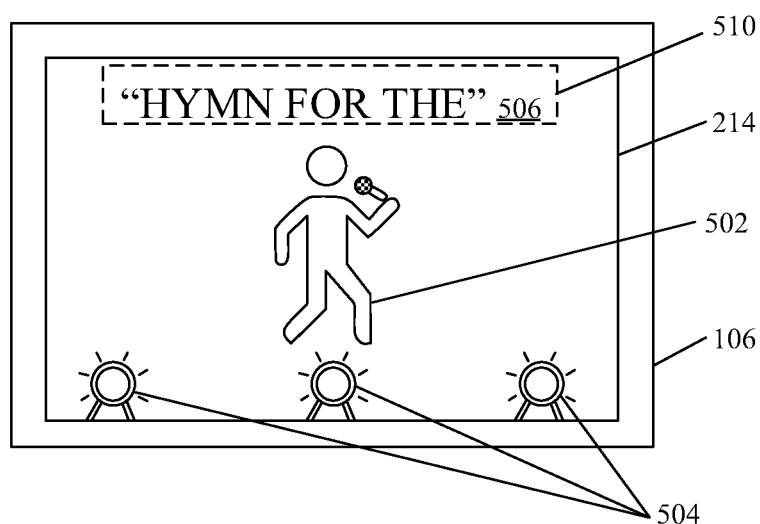

FIGS. 5A and 5B collectively illustrate an exemplary scenario for display of information related to audio content in a live event based on ambient lighting conditions, in accordance with an embodiment of the disclosure. FIGS. 5A and 5B are explained in conjunction with elements from FIGS. 1, 2, 3A, 3B, and 4. With reference to FIG. 5A, there is shown the transparent display 106 and the application interface 214 displayed on the transparent display 106. There is further shown an image of an artist 502, images of a plurality of lights 504, and a text information 506 displayed on the application interface 214 of the transparent display 106. In accordance with an embodiment, the head-mounted device 102 (as shown in FIGS. 3A and 3B) may be worn by the wearer 114 during a live event. The live event may correspond to an event that occurs in a real time or near real time. Examples of the live event may include, but are not limited to, a live concert, a live stage show, a sport event, or a live event in the field-of-view of the first image capturing device 104 (shown in FIG. 3A) of the head-mounted device 102. An artist (such as the artist 502) and the plurality of lights 504 may be present in the live event. In accordance with an embodiment, the artist 502 and the plurality of lights 504 may be included in a first scene viewed by the wearer 114 through the transparent display 106 (e.g. see-through display).

In accordance with an embodiment, the circuitry 202 may be configured to receive the audio segment, such as a song sung or performed by the artist 502 (e.g., a singer) in the real-time during the live event. In some embodiments, the audio segment may correspond to the audio content retrieved from the memory 208 of the head-mounted device 102 or received from the server 108. The circuitry 202 may be further configured to control the first image capturing device 104 to capture a first image of the first scene of the live event in the line-of-sight (LOS) of the wearer 114 of the head-mounted device 102. Thus, the first image capturing device 104 may be configured to capture the first image of the first scene in a direction where the wearer 114 might be looking in the worn state of the head-mounted device 102. The captured first image may include a plurality of objects, such as images of the artist 502 and the plurality of lights 504.

The circuitry 202 may be further configured to determine the level of each image characteristic of the plurality of image characteristics of a background portion and/or a foreground portion of the captured first image. The foreground portion of the captured first image may include the plurality of objects. The plurality of image characteristics may include, but are not limited to, a brightness, a contrast, a background color, a foreground color, a saturation, a hue, and a gamma parameter of the captured first image. The level of each image characteristic of the plurality of image characteristics may vary in each region of a plurality of regions of the captured first image. For example, the brightness level in one region of the captured first image may be higher than other regions based on the lighting conditions around the first image capturing device 104. In another example, a color level (e.g. RGB) in different regions of the first image may be different.

In accordance with an embodiment, the plurality of image characteristics may correspond to ambient lighting conditions around the head-mounted device 102 or in field-of-view of the first image capturing device 104. For example, a brightness level (i.e. image characteristic) of the captured first image may be dependent on a state of the plurality of lights 504 present in the first scene of the live event or in front of the first image capturing device 104. As shown in FIG. 5A, for example, the plurality of lights 504 may be in an inactive state or "OFF" state. In such case, the brightness level of a first image region near the plurality of lights 504 in the captured first image may be lower than other image regions of the first image. In another example, in the "OFF" state, the brightness level of the complete first image may be lower than when the plurality of lights 504 may be in "ON" state.

The circuitry 202 may be configured to estimate a first region 508 on a display portion (such as application interface 214) of the transparent display 106 for display of the text information 506 based on the determined level of each image characteristic of the first image or different regions of the first image. The estimated first region 508 on the display portion of the transparent display 106 may correspond to the first image region near the plurality of lights 504 in the captured first image. In accordance with an embodiment, pixel information or image coordinates of the estimated first region 508 on the display portion of the transparent display 106 may be similar to the first image region in the captured first image, in case a display resolution of the transparent display 106 is equal to an imaging resolution of the first image capturing device 104.

In accordance with an embodiment, the first region 508 on the display portion may be estimated such that the text information 506 to be displayed in the first region 508 does not obscure the plurality of objects of the first scene when viewed by the wearer 114 though the transparent display 106. Thus, the first region 508 may not be estimated or selected on the foreground portion or for the plurality of objects viewed by the wearer 114. Alternatively, the first region 508 may be selected on the background portion of the captured first image.

In some embodiments, the first region 508 on the display portion may be estimated based on the determined level of each image characteristic of the first image. In some embodiments, the first region 508 on the display portion may be estimated based on the determined level of each image characteristic of different regions of the first image. The first region 508 may be estimated on the transparent display 106 such that the visibility and clarity of the text information 506 to be displayed on the first region 508 is high. For example, the first region 508 may not be estimated or selected for a region which indicates a color background pattern because the visibility and readability of the text information 506 in such case may be low. In accordance with an embodiment, the first region 508 may be estimated based on user information stored in the memory 208. The user information may include a color preferred or liked by the wearer 114. For example, the first region 508 in the background portion may be selected to display the text information 506 in case the color level of the background portion is blue as the user information. In some embodiments, the user information may indicate a color which may not be liked or not recognized by the wearer 114. For example, the wearer 114 has a deficiency of color blindness for a red color, then the circuitry 202 may be configured to read the user information and may not select the background portion with the red color level as the first region 508 to display the text information 506. In FIG. 5A, the first region 508 may be selected based on the level of different image characteristics (for example, brightness, color, or contrast).

In accordance with an embodiment, the circuitry 202 may further be configured to determine a first level of each display characteristic from a set of display characteristics for the text information 506 based on the determined level of each image characteristic of the first image. The circuitry 202 may be configured to select the set of display characteristics for the text information 506 from a plurality of display characteristics. In accordance with an embodiment, the plurality of display characteristics for the text information 506 may include, but are not limited to, a foreground color, a background color, a contrast, and a brightness. The circuitry 202 may be configured to select the set of display characteristics for the display of the text information based on the determined level of each image characteristic of the plurality of image characteristics of the captured first image. For example, based on the determined brightness level, the contrast level, the background color, and the foreground color of the captured first image, the circuitry 202 may select a foreground color (or font color) and a brightness level of the text information 506 to be displayed on the display portion of the transparent display 106. In some embodiments, the circuitry 202 may be configured to select the set of display characteristics from the plurality of display characteristics based on a user input provided by the wearer 114 via the I/O device 212. For example, the user input from the wearer 114 is to set the foreground color of the text information 506 to red color and background color to white color. In this regard, the circuitry 202 may be configured to select the foreground color and the background color as the set of display characteristics from the plurality of display characteristics.

In accordance with an embodiment, the first level of each display characteristic for the text information 506 may be determined based on the estimated first region 508 on the display portion. In some embodiments, the first level of each display characteristic for the text information 506 may be determined based on a determined level of each image characteristic in the estimated first region 508. The set of display characteristics may include a color value, a brightness value, a contrast value or size of the text information 506. For example, if the color level of the background of the first region 508 is "White", then the color level for the text information 506 may be "Black". The color level (i.e. display characteristics) for the text information 506 may be in contrast with the color level (i.e. image characteristic) of the background of the first region 508 to further increase the visibility and clarity of the text information. As another example, in case the brightness level of the first region 508 or the first image is high (say during day time), then the circuitry 202 may be configured to select a high contrast level as the display characteristics for the display of the text information 506. As another example, in case the brightness level of the first region 508 or the first image is low (say during night time), then the circuitry 202 may be configured to select a high brightness level as the display characteristics for the display of the text information 506 so that the visibility of the displayed text information is high irrespective of the influence of light sources on the transparent display 106 of the head-mounted device 102.

In accordance with an embodiment, the size of the text information 506 may be determined based on a size of area of the estimated first region 508. The circuitry 202 may be further configured to control display of the text information 506 in the estimated first region 508 of the transparent display 106 based on the determined first level of each display characteristic from the set of display characteristics. For example, as shown in FIG. 5A, the text information 506 (such as "Hymn for the") may be displayed in the first region 508 on the application interface 214 of the transparent display 106. The text information 506 may be displayed such that, the text information 506 is clearly visible to the wearer 114 on the transparent display 106 with high visibility (or clarity) and without obscuring the plurality of objects (e.g. artist 502 and the plurality of lights 504) in the field of view of the wearer 114. In accordance with an embodiment, the text information 506 may be displayed within the first region 508 without an overlap with a see-through region-of-interest (i.e. plurality of objects) in the display portion of the transparent display 106, in the worn state of the head-mounted device 102.

With reference to FIG. 5B, there is shown a scenario, where the plurality of lights 504 in a second scene may be in an active state or "ON" state. In accordance with an embodiment, the circuitry 202 may be configured to control the first image capturing device 104 to capture a second image of the second scene, based on the LOS of the wearer 114. The captured second image may also include the plurality of objects, such as the artist 502 and the plurality of lights 504. In accordance with an embodiment, the positions of the plurality of objects in the captured second image may be different than the positions of the same plurality of objects in the captured first image (as shown and described in FIG. 5A). In some embodiments, a number of objects captured in the second image may be different from a number of objects captured in the first image.

In accordance with an embodiment, the circuitry 202 may be configured to determine a level of each image characteristic of the plurality of image characteristics of the background portion and the foreground portion of the captured second image. The level of each image characteristic of the captured second image may be different than the level of each image characteristic of the captured first image, based on the active or "ON" state of the plurality of lights 504 in the second image. For example, the brightness level of a region near the plurality of lights 504 in the captured second image may be higher than the other regions of the second image of the second scene, when the plurality of lights 504 are in an active state or "ON" state. In another example, the brightness level of the second image (where the plurality of lights 504 are in ON state) may be higher than the first image (where plurality of lights 504 are in OFF state as shown in FIG. 5A)

The circuitry 202 may be further configured to estimate a second region on the display portion of the transparent display 106 for display of the text information 506 based on the determined level of each image characteristic of the plurality of image characteristics of the second image. For example, as shown in FIG. 5B, if the plurality of lights 504 may be in the active state or "ON" state, the circuitry 202 may estimate a second region 510 near head of the artist 502 for display of the text information 506 as the brightness level of a region near the plurality of lights 504 may be high as compared to the other regions of the second image. The circuitry 202 may discard the first region 508 (shown in FIG. 5A) near the plurality of lights 504 due to high influence of the plurality of lights 504 on the first region 508. Due to high influence of the plurality of lights 504 on the first region 508, the text information 506 may not be clearly visible in the first region 508 and may have low clarity. In accordance with an embodiment, the second region 510 on the display portion (such as the application interface 214) may be estimated such that, the text information 506 displayed on the second region 510 may be not obscure or overlap the images of the plurality of objects and may have high visibility for the wearer 114 irrespective of the influence of the ambient light or the light sources on the transparent display 106.

The circuitry 202 may be further configured to determine a second level of each display characteristic from the set of display characteristics for the text information 506 based on the determined level of each image characteristic of the second image or the estimated second region 510. The second level of each display characteristic may be different from the first level of each display characteristic based on the change in position of the plurality of objects from the first scene to the second scene and/or the change in state of the plurality of lights 504 (for example from OFF state in FIG. 5A to ON state in FIG. 5B). For example, a contrast level (e.g. display characteristics) of the text information 506 to be displayed in the second region 508 may be higher than a contrast level for the text information 506 displayed in the first region (shown in FIG. 5A). In another example, the contrast level for the text information 506 to be displayed on the second region 510 may be high because of a high brightness level (e.g. image characteristics) of the second image or the second region 510 due to the influence of the plurality of lights 504 in ON state in FIG. 5B. In another example, the circuitry 202 may be configured to determine the color level for the text information 506 to be displayed on the second region 510 based on the determined image characteristics (such as color, brightness, contrast) of the second region 510 such that the visibility of the text information 506 would be high for the wearer 114.

In accordance with an embodiment, the circuitry 202 may be configured to determine the size of the text information 506 to be displayed in the second region 510 based on the size of the second region 510 and the determined level of each image characteristics of the second region 510. For example, the size of the text information 506 to be displayed in the second region 510 may be greater than the text size of the text information 506 displayed in the first region 508 (shown in FIG. 5A) because of the influence of the plurality of lights 504 in the ON state in FIG. 5B. The higher size of the text information 506 may allow the wearer 114 to clearly view the text information 506 through the transparent display 106 irrespective of the ON state of the plurality of lights 504 in front of the transparent display 106.

The circuitry 202 may be further configured to control display of the text information 506 in the estimated second region 510 of the transparent display 106 based on the determined second level of each display characteristic from the set of display characteristics. For example, as shown in FIG. 5B, the text information 506, such as "Hymn for the" is displayed in the second region 510 on the application interface 214 of the transparent display 106. The text information 506 may be displayed in the second region 510 such that, the text information 506 is clearly visible to the wearer 114 with high clarity irrespective of the ON state of the plurality of lights 504 and does not obscure the plurality of objects (e.g. artist 502 and the plurality of lights 504) in the field of view of the wearer 114. Thus, the estimation of the first region 508 or the second region 510 and the determination of the display characteristics for the text information 506 based on the image characteristics (or the ambient lighting conditions) provides an advanced intelligence to the head-mounted device 102 to display the text information 506 (or the closed caption information) with better visibility for the wearer 114.

In accordance with an embodiment, the circuitry 202 may be configured to dynamically re-estimate the second region 510 and determine the display characteristics for the text information 506 based on change in the image characteristics (or the ambient light conditions) being detected by the capture of the second scene. In some embodiments, the circuitry 202 may be configured to dynamically re-estimate the second region 510 and determine the display characteristics based on change in the LOS of the wearer 114 detected using the second image capturing device 204. The change in the LOS may cause the change in the second scene or change in number or positions of the plurality of objects captured by the second image capturing device 204. In accordance with an embodiment, the circuitry 202 may be configured to detect the movement or the orientation of the head of the wearer 114 through the orientation sensor 206 in the worn state of the head-mounted device 102. The circuitry 202 may be further configured to detect the change in the second scene or change in number or positions of the plurality of objects based on the detected movement or the orientation of the head of the wearer 114. The circuitry 202 may be further configured to re-estimate the second region 510 and determine the display characteristics for the text information 506 based on detected the change in the second scene or change in the number or the positions of the plurality of objects captured by the second image capturing device 204. The circuitry 202 may be further configured to control the display of the text information 506 within the estimated second region 510 of the transparent display 106 based on the LOS of the wearer 114 or detected change in the second scene or change in the number or the positions of the plurality of objects. Thus, the head-mounted device 102 provides a dynamic run-time control of the display of the text information 506 with higher visibility for the wearer 114 irrespective of the change in the ambient light conditions or change in the scene (or the plurality of objects in view of the wearer 114).

The circuitry 202 may be further configured to control playback of the received audio segment, via a speaker, such as the speaker 212A. For example, the received audio segment may correspond to the song performed by the artist 502 during the live concert. In some other embodiment, the received audio segment may be pre-recorded audio content that may be received from the memory 208 or from the server 108. The circuitry 202 may control the playback of the received audio segment, via the speaker 212A in synchronization with the display of the text information 506 (associated with the audio segment) on the transparent display 106. Thus, the wearer 114 of the head-mounted device 102 may view the text information 506 (for example, "Hymn for the", as shown in FIG. 5A) associated with the audio segment with better clarity and concurrently hear the audio segment, via the speaker 212A in the real-time or near real-time. The concurrent and synchronized display of the text information 506 and playback of the associated audio segment may facilitate the wearer 114 (either hearing-impaired or visually-impaired) to get better experience of audio-content reproduction.

Figure 6A:
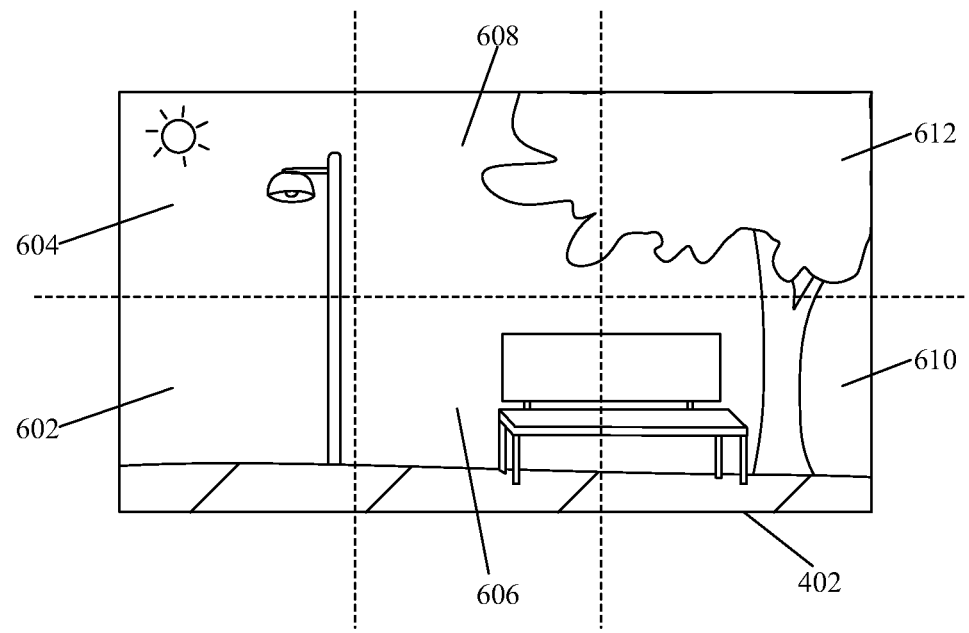
FIGS. 6A and 6B collectively illustrate a plurality of image regions of an image captured by an image capturing device of the head-mounted device, in accordance with an embodiment of the disclosure.
Figure 6B:
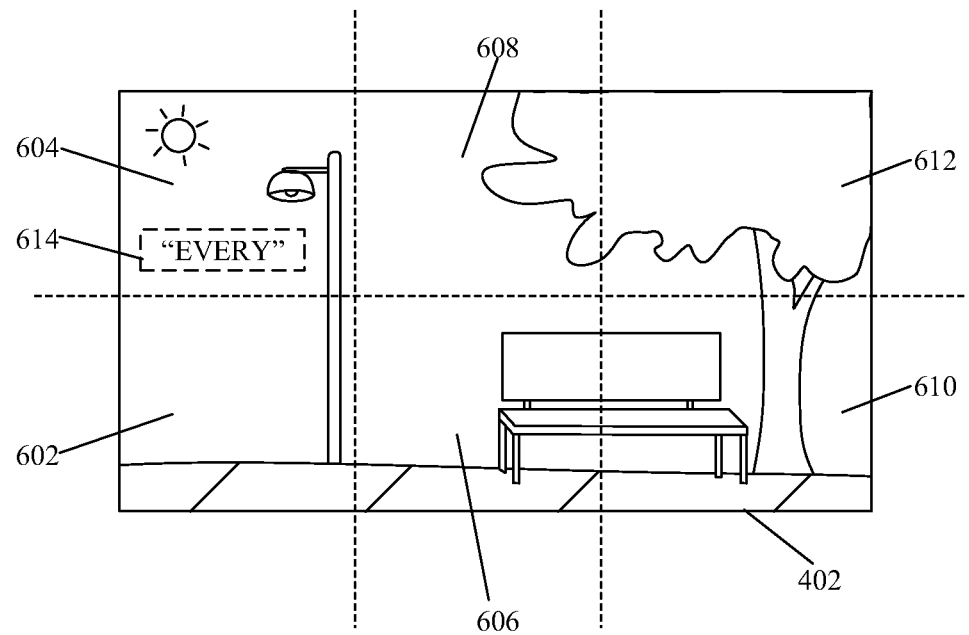

FIGS. 6A and 6B collectively a plurality of image regions of an image captured by an image capturing device of the head-mounted device, in accordance with an embodiment of the disclosure. FIGS. 6A and 6B are explained in conjunction with elements from FIGS. 1, 2, 3A, 3B, 4, 5A, and 5B. With reference to FIG. 6A, there is shown the first image 402 captured by the first image capturing device 104. In accordance with an embodiment, the circuitry 202 may be configured to partition the first image 402 in a plurality of image regions, such as a first image region 602, a second image region 604, a third image region 606, a fourth image region 608, a fifth image region 610, and a sixth image region 612. Each image region of the plurality of image regions may include a set of pixels or sub-pixels of the first image 402.

With reference to FIG. 6B, there is shown the first image 402, which includes the first image region 602, the second image region 604, the third image region 606, the fourth image region 608, the fifth image region 610, the sixth image region 612, and a text information 614. In accordance with an embodiment, the circuitry 202 may be configured to determine the level of each image characteristic of the plurality of image characteristics for each image region of the plurality of image regions of the first image 402. The level of each image characteristic of the plurality of image characteristics for each image region may be different. In accordance with an embodiment, examples of the plurality of image characteristics may include, but are not limited to, a brightness, a contrast, a background color, a foreground color, a saturation, a hue, and a gamma parameter of the first image 402.

In accordance with an embodiment, the circuitry 202 may be further configured to determine an image region, such as the second image region 604, from the plurality of image regions based on the determined level of each image characteristic for each image region of the plurality of image regions. For example, the circuitry 202 may be configured to determine a brightness level for each image region of the plurality of image regions. The circuitry 202 may be further configured to compare the determined brightness level of each of the plurality of image regions to identify the image region of the first image 402, which has the maximum brightness level. As per FIG. 6B, the circuitry 202 may be configured to identify the second image region 604 with maximum brightness level as compared to the brightness levels of other image regions of the plurality of image regions. For example, the brightness level of the second image region 604 may be maximum due to light illumination from two light sources, for example, the sun and the lamp post (as shown in FIGS. 6A and 6B) captured in the second image region 604. On the other hand, the brightness level of the fifth image region 610 may be lesser due to shade from an object, such as the tree captured in the fifth image region 610 of the first image 402.

In accordance with an embodiment, the circuitry 202 may be further configured to determine a level of each display characteristic from the set of display characteristics of the text information 614 (for example, "Every" as shown in FIG. 6B) associated with the received audio segment. The audio segment may be a portion of the song to be rendered in synchronization with the display of the first image 402 on the transparent display 106. The text information may represent the textual representation (for example lyric information) of the received audio segment.

The circuitry 202 may be configured to determine a level of brightness, contrast, foreground color, background color of the text information 614 to be displayed on the second image region 604 which is identified based on the brightness levels of the plurality of image regions of the first image 402. In accordance with an embodiment, the level of each display characteristic from the set of display characteristics of the text information 614 may be determined based on the level of each of the image characteristics associated with the second image region 604. The circuitry 202 may be configured to determine the level of each display characteristic of the text information 614 such that, the determined level of each display characteristic may be in contrast with the level of each image characteristic associated with the second image region 604. For example, a foreground color value (or font color) of the text information 614 may be in contrast with a background color value of the second image region 604. In another example, the brightness level (i.e. display characteristics) of the text information 614 may be different (or in contrast) from the brightness level (i.e. image characteristic) associated with the second image region 604 of the first image 402. Thus, the wearer 114 of the head-mounted device 102 may be able to clearly distinguish between the displayed text information 614 and a portion of the first scene 112 displayed on the second image region 604. Such clear distinguish between the display characteristics of the text information 614 and the image characteristics of the second image region 604 may allow the wearer 114 to clearly read or recognize the text information 614 even though the image characteristics are being affected based on the influence of the ambient lighting condition around the head-mounted device 102. In accordance with an embodiment, the circuitry 202 may be configured to determine the second image region 604 as the brightest region among the plurality of image regions and control the display of the text information 614 within a region on the transparent display 106 based on the determined second image region 604. The region on the transparent display 106 may be similar (i.e. with same pixel information) to the determined second image region 604 of the first image 402.

Figure 7A:
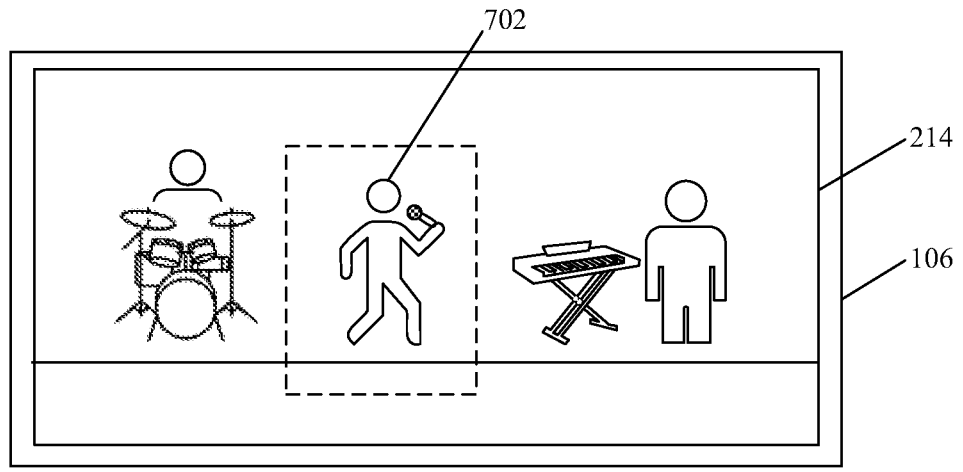
FIGS. 7A and 7B collectively illustrate an exemplary scenario for display of information related to audio content based on ambient lighting conditions associated with an enhanced view of an object in a captured image, in accordance with an embodiment of the disclosure.
Figure 7B:
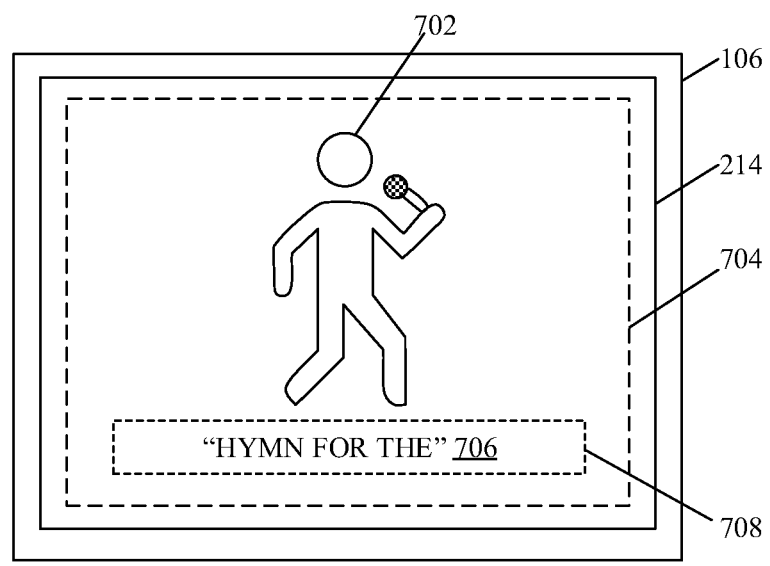

FIGS. 7A and 7B collectively illustrate an exemplary scenario for display of information related to audio content based on ambient lighting conditions associated with an enhanced view of an object in a captured image, in accordance with an embodiment of the disclosure. FIGS. 7A and 7B are explained in conjunction with elements from FIGS. 1, 2, 3A, 3B, 4, 5A, 5B, 6A, and 6B. With reference to FIG. 7A, there is shown the transparent display 106, the application interface 214 and a plurality of objects captured in a first scene (for example a live event) in field of view of the first image capturing device 104. The captured images of the plurality of objects may be displayed on the application interface 214 of the transparent display 106. In accordance with an embodiment, the plurality of objects may include a first object 702 (such as an artist in the live event). For example, the captured image of the first scene may include a singer, other technicians, such as a drummer, a pianist, and the like.

In accordance with an embodiment, the circuitry 202 may be further configured to receive a user-input, through the I/O device 212, for selection of an object, such as the first object 702. The selection may be to display an enhanced view (such as zoomed view) of the first object 702. The circuitry 202 may be configured to receive the selection of the first object 702 from the plurality of objects via the application interface 214 (e.g. a user interface). For example, the wearer 114 of the head-mounted device 102 may be at a specific distance from a stage during the live event and may not be able to clearly see the artist (i.e. first object 702) singing on the stage. Therefore, the circuitry 202 may be configured to receive the selection of the artist (i.e. first object 702) from the wearer 114 to view the enhanced view of the first object 702.

With reference to FIG. 7B, there is shown the transparent display 106 with display of an enhanced view 704 of the first object 702. The circuitry 202 may be further configured to control display of the enhanced view 704 of the first object 702 on the transparent display 106, based on the selection (e.g. zoom operation) of the first object 702 by the wearer 114. In accordance with an embodiment, the circuitry 202 may be further configured to determine the level of each image characteristic of the plurality of image characteristics associated with the enhanced view 704 of the first object 702. The level of each image characteristic of the plurality of image characteristics associated with the enhanced view 704 of the first object 702 may be based on the ambient lighting conditions around the first object 702 in the live event. In some embodiments, the enhanced view 704 of the first object 702 may be enhancement in the level of image characteristic of the first object 702 on the transparent display 106.

The circuitry 202 may be further configured to estimate a first region 708 for display of the text information 706, associated with the received audio segment, on the display portion (i.e. application interface 214) of the transparent display 106 of the head-mounted device 102. In accordance with an embodiment, for example, the received audio segment may be a portion of the song sung by the artist (i.e. first object 702) during the live event. The text information 706 associated with the received audio segment may be the lyrics information associated with the portion of the song sung by the artist (i.e. first object 702) during the live concert. The first region 708 for the display of the text information 706 may be estimated based on the determined level of each image characteristics of the plurality of image characteristics associated with the enhanced view 704 of the first object 702 as described in detail in FIGS. 5A and 5B. The circuitry 202 may be configured to estimate the first region 708 for display of the text information 706 such that the displayed text information 706 may have higher visibility and does not obscure the plurality of objects (such as the first object 702) displayed on the transparent display 106. For example, as shown in FIG. 7B, the text information 706, such as "Hymn for the", is displayed near feet of the first object 702 (e.g., a singer) in the captured image such that the obstructed vision of the enhanced view 704 of the first object 702 may be prevented.

The circuitry 202 may be further configured to determine a level of each display characteristic from the set of display characteristics associated the text information 706 associated with the received audio segment (such as the portion of the song sung by the artist during the live concert). The level of each display characteristic from the set of display characteristics (such as brightness, contrast, font size, color, and the like) may be determined based on the determined level of each image characteristic associated with the enhanced view 704 of the first object 702 or the estimated first region 708 as described in detail, for example, in FIGS. 6A and 6B. The circuitry 202 may be further configured to control display of the text information 706 in the estimated first region 708 based on the determined level of each display characteristic from the set of display characteristics for the text information 706.

Figure 8:
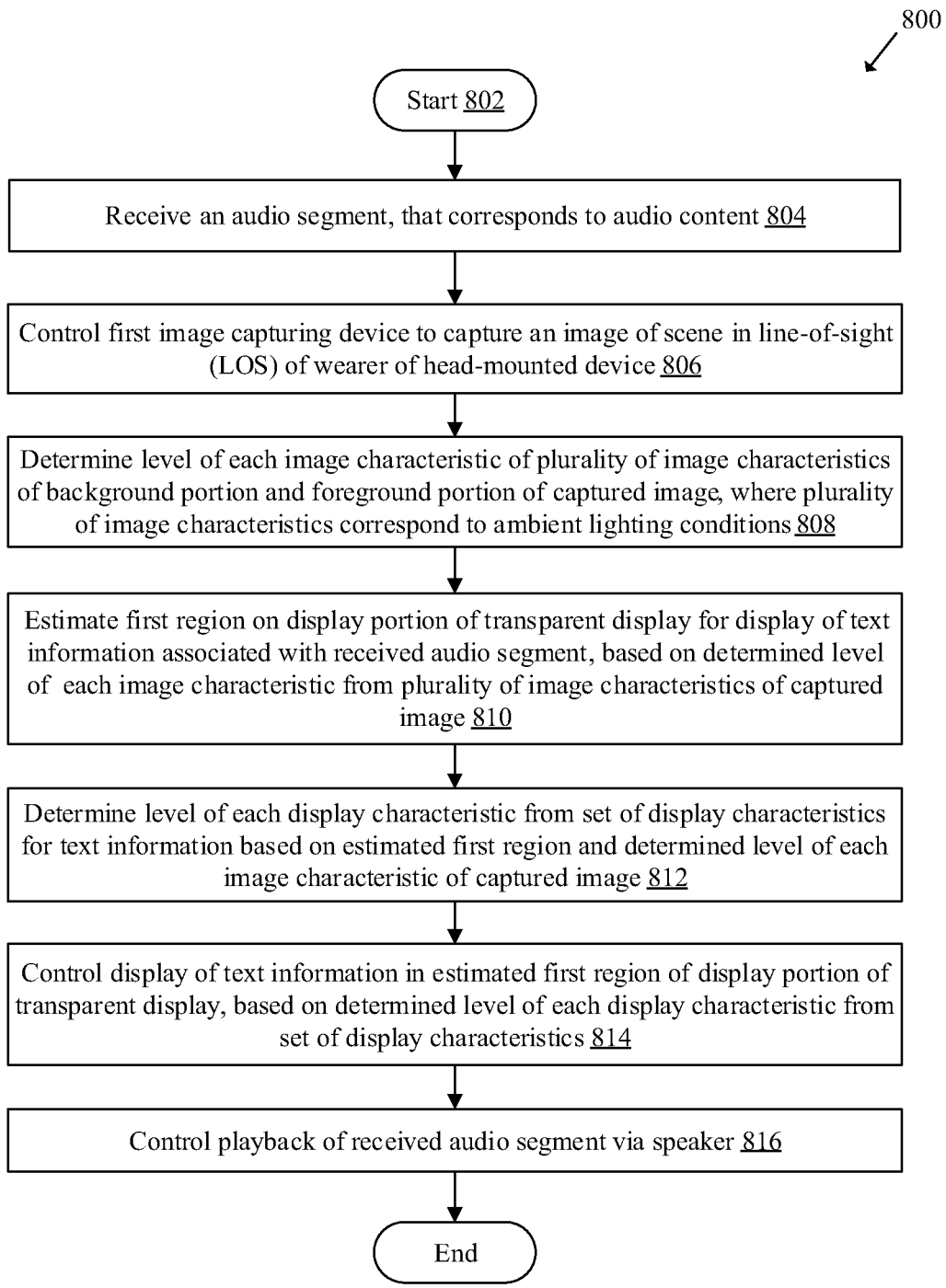
FIG. 8 depicts a flowchart that illustrates exemplary operations for display of information related to audio content based on ambient lighting conditions, in accordance with an embodiment of the disclosure.

FIG. 8 depicts a flowchart that illustrates exemplary operations for display of information related to audio content based on ambient lighting conditions, in accordance with an embodiment of the disclosure. With reference to FIG. 8, there is shown a flowchart 800. The flowchart 800 is described in conjunction with FIGS. 1, 2, 3A, 3B, 4, 5A, 5B, 6A, 6B, 7A, and 7B. The operations from 804 to 816 may be implemented in the head-mounted device 102. The operations of the flowchart 800 may start at 802 and proceed to 804.

At 804, an audio segment may be received, that corresponds to audio content. The circuitry 202 may be configured to receive the audio segment that corresponds to the audio content (such as a song, a music file). In some embodiments, the audio segment may be pre-recorded and may be received from the server 108, via the communication network 110. In some embodiments, the audio segment may be retrieved from the memory 208. In another embodiment, the audio segment may be received from an audio capturing device, such as microphone, which captures the audio segment during a live event (such as a live concert or live presentation).

At 806, the first image capturing device 104 may be controlled to capture an image of a scene in a line-of-sight (LOS) of the wearer 114 of the head-mounted device 102. The circuitry 202 may be configured to control the first image capturing device 104 to capture the image of the scene in the LOS of the wearer 114. The LOS of the wearer 114 may be determined using the second image capturing device 204 and the orientation sensor 206 of the head-mounted device 102.

At 808, a level of each image characteristic of the plurality of image characteristics of a background portion and a foreground portion of the captured image may be determined, where the plurality of image characteristics correspond to ambient lighting conditions. The circuitry 202 may be configured to determine the level of each image characteristic of the plurality of image characteristics of the background portion and the foreground portion of the captured image. In some embodiments, the circuitry 202 may be configured to partition the captured image in a plurality of regions. The circuitry 202 may be further configured to determine the level of each image characteristic of the plurality of image characteristics for each of the plurality of regions of the captured image. The partitioning of the captured image is shown and described in detail, for example, in FIGS. 6A and 6B. Examples of the plurality of image characteristics may include, but are not limited to, a brightness, a contrast, a background color, a foreground color, a saturation, a hue, and a gamma parameter.

At 810, a first region on display portion of the transparent display 106 may be estimated for display of the text information associated with the received audio segment, based on the determined level of each image characteristic from the plurality of image characteristics of the captured image. The circuitry 202 may be configured to estimate or identify the first region based on the determined level of each image characteristic from the plurality of image characteristics of the captured image. The estimation of the first region for the display of the text information is described in detail, for example, in FIGS. 5A and 5B.

At 812, a level of each display characteristic from the set of display characteristics for the text information may be determined based on the estimated first region and the determined level of each image characteristic of the captured image. The circuitry 202 may be configured to determine the level of each display characteristic from the set of display characteristics for the text information associated with the audio content. The determination of the level of each display characteristic is described in detail, for example, in FIGS. 5A and 5B. In accordance with an embodiment, the circuitry 202 may be configured to identify a position of the received audio segment in the audio content based on lyrics information associated with the audio content. The lyrics information associated with the audio content may be stored in the memory, such as the memory 208. The circuitry 202 may be further configured to extract the text information associated with the received audio segment from the stored lyrics information, based on the identified position of the audio segment in the audio content.

At 814, display of the text information in the estimated first region of the display portion of the transparent display 106 may be controlled, based on the determined level of each display characteristic from the set of display characteristics. The circuitry 202 may be configured to control the display text information in the estimated first region of the transparent display 106. The display of the text information in the first region is described in detail, for example, in FIGS. 5A and 5B.

At 816, playback of the received audio segment may be controlled via a speaker. The circuitry 202 may be configured to control the playback of the received audio segment for the wearer 114 of the head-mounted device, via the speaker, such as the speaker 212A. The circuitry 202 may be configured to control playback of the received audio segment via the speaker 212A, along with the display of the text information associated with the audio segment on the transparent display 106 in real-time or near real-time. The control may pass to end.

Exemplary aspects of the disclosure may include a head-mounted device (such as the head-mounted device 102) that includes a transparent display (such as the transparent display 106). The head-mounted device 102 may further include a first image capturing device (such as the first image capturing device 104) configured to capture an image of a scene in a line-of-sight (LOS) of a wearer (such as the wearer 114) of the head-mounted device 102. The head-mounted device 102 may further include circuitry (such as the circuitry 202) configured to receive an audio segment that corresponds to audio content. The circuitry 202 may be configured to determine a level of each image characteristic from a plurality of image characteristics of a background portion and a foreground portion of the captured image. The plurality of image characteristics may correspond to ambient lighting conditions. The circuitry 202 may be further configured to estimate a first region on a display portion of the transparent display for display of text information associated with the received audio segment. The first region may be estimated based on the determined level of each image characteristic from the plurality of image characteristics.

The circuitry 202 may be further configured to determine a level of each display characteristic from a set of display characteristics for the text information based on the estimated first region and the determined level of each image characteristic from the plurality of image characteristics. The circuitry 202 may be further configured to control the display of the text information in the estimated first region of the display portion of the transparent display, based on the determined level of each display characteristic from the set of display characteristics.

In accordance with an embodiment, the head-mounted device 102 may further include a second image capturing device (such as the second image capturing device 204) configured to track an eye movement of the wearer 114. The circuitry 202 may be further configured to determine the LOS of the wearer 114 based on the tracked eye movement of the wearer 114. The head-mounted device 102 may further include an orientation sensor (such as the orientation sensor 206) configured to determine an orientation of the head-mounted device 102 in a worn state of the head-mounted device 102. The circuitry may be further configured to determine the LOS of the wearer 114 based on the determined orientation of the head-mounted device 102.

The plurality of image characteristics may include a brightness, a contrast, a background color, a foreground color, a saturation, a hue, and a gamma parameter of the captured image. The determined level of each display characteristic from the set of display characteristics of the text information may be in contrast with the determined level of each image characteristic from the plurality of image characteristics.

In accordance with an embodiment, the circuitry 202 may be further configured to partition the captured image into a plurality of image regions. The circuitry 202 may be further configured to estimate a brightness level for each of the plurality of image regions. The circuitry 202 may be further configured to determine a first image region from the plurality of image regions based on a brightness level for each of the plurality of image regions. The first image region may correspond to the estimated first region on the display portion. The circuitry 202 may be further configured to control the display of the text information within the determined first region of the display portion of the transparent display, based on the determined first image region. In accordance with an embodiment, the brightness level of the determined first image region may be maximum among the brightness level for each of the plurality of image regions.

In accordance with an embodiment, the estimation of the first region on the display portion of the transparent display for the display of the text information may be further based on the LOS of the wearer 114. The display of the text information within the estimated first region of the display portion of the transparent display may be further based on the LOS of the wearer 114.

In accordance with an embodiment, the head-mounted device 102 may further include a memory (such as the memory 208) configured to store lyrics information associated with the audio content. The circuitry 202 may be further configured to identify a position of the received audio segment in the audio content based on the stored lyrics information. The circuitry 202 may be further configured to extract the text information from the stored lyrics information, based on the identified position.

In accordance with an embodiment, the circuitry 202 may be further configured to select, from a plurality of display characteristics, the set of display characteristics for the text information. The determination of the level of each display characteristic from the set of display characteristics may be further based on a user-input. The plurality of display characteristics may include a foreground color, a background color, a contrast, and a brightness for the text information displayed on the display portion of the transparent display. In accordance with an embodiment, the text information may be displayed within the first region without an overlap with a see-through region-of-interest in the display portion of the transparent display, in the worn state of the head-mounted device 102.

In accordance with an embodiment, the circuitry 202 may be further configured to control display of an enhanced view of an object from one or more objects in the foreground portion of the captured image. The display of the enhanced view of the object may be controlled on the display portion of the transparent display, based on a user selection of the object. The circuitry 202 may be further configured to determine the level of each image characteristic of the plurality of image characteristics associated with the enhanced view of the object. The circuitry 202 may be further configured to determine the level of each display characteristic from the set of display characteristics for the text information, based on the determined level of each image characteristic from the plurality of image characteristics for the enhanced view. The circuitry 202 may be further configured to control playback of the received audio segment via a speaker (such as the speaker 212A).

Various embodiments of the disclosure may provide a non-transitory, computer-readable medium and/or storage medium, and/or a non-transitory machine readable medium and/or storage medium stored thereon, a set of instructions executable by a machine and/or a computer for display of information related to audio content based on ambient lighting conditions. The set of instructions may be executable by the machine and/or the computer to perform the steps that may comprise capture of an image of a scene in a line-of-sight (LOS) of a wearer of a head-mounted device. An audio segment may be received that corresponds to audio content. A level of each image characteristic from a plurality of image characteristics of a background portion and a foreground portion of the captured image may be determined. The plurality of image characteristics may correspond to ambient lighting conditions. A first region may be estimated on a display portion of the transparent display for display of text information associated with the received audio segment, based on the determined level of each image characteristic from the plurality of image characteristics. A level of each display characteristic from a set of display characteristics may be determined for the text information based on the estimated first region and the determined level of each image characteristic from the plurality of image characteristics. The display of the text information may be controlled in the estimated first region of the display portion of the transparent display, based on the determined level of each display characteristic from the set of display characteristics The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. A head-mounted device, comprising:
    a transparent display;
    a first image capturing device configured to capture an image of a scene in a line-of-sight (LOS) of a wearer of the head-mounted device; and
    circuitry configured to:
        receive an audio segment that corresponds to audio content;
        partition the captured image into a plurality of image regions;
        determine a level of each image characteristic from a plurality of image characteristics of a background portion and a foreground portion of each of the plurality of image regions of the captured image, wherein
            the plurality of image characteristics corresponds to ambient lighting conditions, and
            the plurality of image characteristics includes a brightness level of each of the plurality of image regions;
        compare the brightness level between the plurality of image regions;
        determine a first image region of the plurality of image regions based on a result of the comparison of the brightness level between the plurality of image regions;
        determine a first region on a display portion of the transparent display for display of text information associated with the received audio segment, based on the determined level of each image characteristic from the plurality of image characteristics, wherein
            the first region corresponds to the first image region of the plurality of image regions, and
            the brightness level of the first image region is maximum among the brightness level of each of the plurality of image regions;
        determine a level of each display characteristic from a set of display characteristics for the text information based on the determined first region and the determined level of each image characteristic from the plurality of image characteristics; and
        control the display of the text information in the determined first region of the display portion of the transparent display, based on the determined level of each display characteristic from the set of display characteristics.

2. The head-mounted device according to claim 1, further comprising a second image capturing device configured to track an eye movement of the wearer,
    wherein the circuitry is further configured to determine the LOS of the wearer based on the tracked eye movement of the wearer.

3. The head-mounted device according to claim 1, further comprising an orientation sensor configured to determine an orientation of the head-mounted device in a worn state of the head-mounted device,
    wherein the circuitry is further configured to determine the LOS of the wearer based on the determined orientation of the head-mounted device.

4. The head-mounted device according to claim 1, wherein the plurality of image characteristics further comprises a contrast, a background color, a foreground color, a saturation, a hue, and a gamma parameter of the captured image.

5. The head-mounted device according to claim 1, wherein the determined level of each display characteristic from the set of display characteristics of the text information is in contrast with the determined level of each image characteristic from the plurality of image characteristics.

6. The head-mounted device according to claim 1, wherein the determination of the first region on the display portion of the transparent display for the display of the text information is further based on the LOS of the wearer.

7. The head-mounted device according to claim 1, wherein the display of the text information within the determined first region of the display portion of the transparent display is further based on the LOS of the wearer.

8. The head-mounted device according to claim 1, further comprising a memory configured to store lyrics information associated with the audio content,
    wherein the circuitry is further configured to:
        identify a position of the received audio segment in the audio content based on the stored lyrics information; and
        extract the text information from the stored lyrics information, based on the identified position.

9. The head-mounted device according to claim 1, wherein the circuitry is further configured to:
    select, from a plurality of display characteristics, the set of display characteristics for the text information, wherein the determination of the level of each display characteristic from the set of display characteristics is further based on a user-input.

10. The head-mounted device according to claim 9, wherein the plurality of display characteristics comprises a foreground color, a background color, a contrast, and a brightness for the text information displayed on the display portion of the transparent display.

11. The head-mounted device according to claim 1, wherein, in a worn state of the head-mounted device, the text information is displayed within the first region without an overlap with a see-through region-of-interest in the display portion of the transparent display.

12. The head-mounted device according to claim 1, wherein the circuitry is further configured to:
    control display of an enhanced view of an object, from one or more objects in the foreground portion of the captured image, on the display portion of the transparent display, based on a user selection of the object;
    determine the level of each image characteristic of the plurality of image characteristics associated with the enhanced view of the object; and
    determine the level of each display characteristic from the set of display characteristics for the text information, based on the determined level of each image characteristic from the plurality of image characteristics for the enhanced view.

13. The head-mounted device according to claim 1, wherein
the circuitry is further configured to control playback of the received audio segment via a speaker, and
the playback of the received audio segment is in synchronization with the display of the text information in the first region of the display portion of the transparent display.

14. The head-mounted device according to claim 1, wherein
the circuitry is further configured to change the first region on the display portion to a second region on the display portion, for the display of the text information, based on a change in the LOS of the wearer from a first position to a second position, and
the second region corresponds a second image region of the plurality of image regions.

15. The head-mounted device according to claim 1, wherein the circuitry is further configured to change a display size of the text information based on a size of an area of the determined first region.

16. A method, comprising:
in a head-mounted device that comprises a transparent display, a first image capturing device, and circuitry:
capturing, by the first image capturing device, an image of a scene in a line-of-sight (LOS) of a wearer of the head-mounted device;
receiving, by the circuitry, an audio segment that corresponds to audio content;
partitioning, by the circuitry, the captured image into a plurality of image regions;
determining, by the circuitry, a level of each image characteristic from a plurality of image characteristics of a background portion and a foreground portion of each of the plurality of image regions of the captured image, wherein
the plurality of image characteristics corresponds to ambient lighting conditions, and
the plurality of image characteristics includes a brightness level of each of the plurality of image regions;
comparing, by the circuitry, the brightness level between the plurality of image regions;
determining, by the circuitry, a first image region of the plurality of image regions based on a result of the comparison of the brightness level between the plurality of image regions;
determining, by the circuitry, a first region on a display portion of the transparent display for display of text information associated with the received audio segment, based on the determined level of each image characteristic from the plurality of image characteristics, wherein
the first region corresponds to the first image region of the plurality of image regions, and
the brightness level of the first image region is maximum among the brightness level of each of the plurality of image regions;
determining, by the circuitry, a level of each display characteristic from a set of display characteristics for the text information based on the determined first region and the determined level of each image characteristic from the plurality of image characteristics; and
controlling, by the circuitry, the display of the text information in the determined first region of the display portion of the transparent display, based on the determined level of each display characteristic from the set of display characteristics.

17. The method according to claim 16, further comprising:
tracking, by a second image capturing device, an eye movement of the wearer; and
determining, by the circuitry, the LOS of the wearer based on the tracked eye movement of the wearer.

18. The method according to claim 16, further comprising:
determining an orientation of the head-mounted device in a worn state of the head-mounted device; and
determining, by the circuitry, the LOS of the wearer based on the determined orientation of the head-mounted device.

19. The method according to claim 16, wherein the determined level of each display characteristic from the set of display characteristics for the text information is in contrast with the determined level of each image characteristic from the plurality of image characteristics.

20. A non-transitory computer-readable medium having stored thereon, computer-executable instructions which, when executed by a head-mounted device that comprises a transparent display and an image capturing device, cause the head-mounted device to execute operations, the operations comprising:
capturing, by the image capturing device, an image of a scene in a line-of-sight (LOS) of a wearer of the head-mounted device;
receiving an audio segment that corresponds to audio content;
partitioning the captured image into a plurality of image regions;
determining a level of each image characteristic from a plurality of image characteristics of a background portion and a foreground portion for each of the plurality of image regions of the captured image, wherein
the plurality of image characteristics corresponds to ambient lighting conditions, and
the plurality of image characteristics includes a brightness level of each of the plurality of image regions;
comparing the brightness level between the plurality of image regions;
determining a first image region of the plurality of image regions based on a result of the comparison of the brightness level between the plurality of image regions;
determining a first region on a display portion of the transparent display for display of text information associated with the received audio segment, based on the determined level of each image characteristic from the plurality of image characteristics, wherein
the first region corresponds to the first image region of the plurality of image regions, and
the brightness level of the first image region is maximum among the brightness level of each of the plurality of image regions;
determining a level of each display characteristic from a set of display characteristics for the text information based on the determined first region and the determined level of each image characteristic from the plurality of image characteristics; and
controlling the display of the text information in the determined first region of the display portion of the transparent display, based on the determined level of each display characteristic from the set of display characteristics.

* * * * *